US010855566B2

(12) United States Patent
Nochta

(10) Patent No.: US 10,855,566 B2
(45) Date of Patent: Dec. 1, 2020

(54) EFFICIENCY AND PERFORMANCE IN INTERNET-OF-THINGS SCENARIOS

(71) Applicant: SAP SE, Walldorf (DE)

(72) Inventor: Zoltan Nochta, Karlsruhe (DE)

(73) Assignee: SAP SE, Walldorf (DE)

(*) Notice: Subject to any disclaimer, the term of this patent is extended or adjusted under 35 U.S.C. 154(b) by 78 days.

(21) Appl. No.: 15/281,442

(22) Filed: Sep. 30, 2016

(65) Prior Publication Data

US 2018/0097710 A1 Apr. 5, 2018

(51) Int. Cl.
G06F 15/173 (2006.01)
H04L 12/26 (2006.01)
H04L 29/08 (2006.01)
G06F 21/62 (2013.01)
H04W 4/38 (2018.01)
H04L 29/06 (2006.01)

(52) U.S. Cl.
CPC .......... H04L 43/08 (2013.01); G06F 21/6218 (2013.01); H04L 67/12 (2013.01); H04W 4/38 (2018.02); H04L 63/0428 (2013.01)

(58) Field of Classification Search
CPC ..... H04L 43/08; H04L 63/0428; H04L 67/12; H04L 67/42; G04F 17/18; G06F 17/18; G06F 21/6218; H04W 4/38
USPC .......................... 709/224, 223, 203, 206, 219
See application file for complete search history.

(56) References Cited

U.S. PATENT DOCUMENTS

| 7,685,089 | B2 | 3/2010 | Nochta et al. | |
|---|---|---|---|---|
| 7,725,577 | B2 | 5/2010 | Nochta et al. | |
| 7,827,398 | B2 * | 11/2010 | Liu | H04L 63/0485 380/255 |
| 7,974,415 | B2 | 7/2011 | Nochta | |
| 8,005,879 | B2 | 8/2011 | Bornhoevd et al. | |
| 8,037,294 | B2 | 10/2011 | Nochta | |
| 8,065,411 | B2 | 11/2011 | Spiess et al. | |
| 8,459,550 | B2 | 6/2013 | Nochta | |
| 8,522,341 | B2 | 8/2013 | Nochta et al. | |
| 2005/0114708 | A1 * | 5/2005 | DeStefano | H04L 63/1425 726/4 |
| 2008/0010239 | A1 | 1/2008 | Nochta | |
| 2009/0327445 | A1 * | 12/2009 | van Rietschote | G06F 11/1464 709/213 |
| 2013/0238477 | A1 * | 9/2013 | Green | G06Q 40/06 705/35 |
| 2014/0015987 | A1 * | 1/2014 | Harple | G06F 3/005 348/207.1 |
| 2015/0095814 | A1 * | 4/2015 | Liu | H04W 4/18 715/763 |

(Continued)

Primary Examiner — Kaylee J Huang
(74) Attorney, Agent, or Firm — Fish & Richardson P.C.

(57) ABSTRACT

A set of measurement data is gathered by a network-enabled end device over a period of time. A mathematical function is generated to describe behavior of the set of measurement data. A compact, encoded message is generated representing the behavior of the gathered set of measurement data and the compact, encoded message is transmitted for storage in a data store associated with a backend server. Responsive to a received data analysis request, particular compact, encoded messages stored in the data store and applicable to the data analysis request are decoded. Time series data reconstructing the measurement data based on the decoded messages is generated.

17 Claims, 3 Drawing Sheets

(56) References Cited

U.S. PATENT DOCUMENTS

| | | | |
|---|---|---|---|
| 2015/0332523 A1* | 11/2015 | Ranasinghe | H04W 24/10 701/34.2 |
| 2016/0070676 A1* | 3/2016 | Riemers | G06F 3/1206 715/229 |
| 2018/0063092 A1* | 3/2018 | Ollikainen | H04L 63/0428 |
| 2018/0276778 A1* | 9/2018 | Kim | G06Q 50/26 |

* cited by examiner

EFFICIENCY AND PERFORMANCE IN INTERNET-OF-THINGS SCENARIOS

BACKGROUND

Internet-of-Things (IoT) end devices (for example, mobile phones and sensor nodes) collect information about their environment (for example, temperature, air pressure, humidity, etc.) or about themselves (for example position, velocity, vibration frequency, etc.) by using various sensor and measurement technologies. Current IoT solutions often collect a large number of sensor/measurement datasets. These datasets are generated and sent by the end devices over the Internet to a solution provider's central monitoring system. The resulting amount of gathered data is stored and processed according to the needs of a given application as defined by one or more use cases.

High-frequency (or "chatty") communications and related data storage has resulted in an explosion of operational costs and setup problems. For example, collecting and sending sensor data with a desired density, frequency of observation (for example, every two minutes), and accuracy also leads to high energy consumption at the end devices' side. This may lead to unacceptably high operational costs, since end devices' batteries have to be recharged/replaced frequently.

A particular service provider also needs powerful, expensive network, processing, and storage capabilities to handle the speed and amount of incoming data, processing requirements, and data storage management. This is particularly true given that each particular IoT application can receive data from multiple end devices.

SUMMARY

The present disclosure describes methods and systems, including computer-implemented methods, computer program products, and computer systems for improving efficiency and performance in Internet-of-Things (IoT) scenarios.

In an implementation, a set of measurement data is gathered by a network-enabled end device over a period of time. A mathematical function is generated to describe behavior of the set of measurement data. A compact, encoded message is generated representing the behavior of the gathered set of measurement data and the compact, encoded message is transmitted for storage in a data store associated with a backend server. Responsive to a received data analysis request, particular compact, encoded messages stored in the data store and applicable to the data analysis request are decoded. Time series data reconstructing the measurement data based on the decoded messages is generated.

The above-described implementation is implementable using a computer-implemented method; a non-transitory, computer-readable medium storing computer-readable instructions to perform the computer-implemented method; and a computer-implemented system comprising a computer memory interoperably coupled with a hardware processor configured to perform the computer-implemented method/the instructions stored on the non-transitory, computer-readable medium.

The subject matter described in this specification can be implemented in particular implementations so as to realize one or more of the following advantages. First, in the described alternative approach, an end device (for example, a sensor node) only sends a message to a target backend using a network in the case where the behavior of an observed parameter (for example, temperature) changes, instead of sending all the measured values (either compressed or uncompressed) or not sending anything until a certain threshold value is reached. This has the advantage of both decreasing the amount of energy used by CPUs to compress data and enhancing the use of per-message overhead by a carrying network protocol. Second, loss of information in time-series analysis is mitigated. Third, reconstruction of measurements can be performed using stored behavior (a mathematical or statistical function) data determined by a sensor node. In other words, a data receiver can redraw the actual development of the parameter in question, without storing large amounts of mostly redundant or useless data. Third, sensor nodes are typically required to send only a few messages, especially if the observed values do not frequently or radically change their behavior. Extreme events, such as a sudden increase of temperature, are still indicated to a data collecting backend server, since the measured curve rapidly changes its behavior. Fourth, the described approach helps reduce transmission, receiving, process, and storage resources with respect to IoT scenarios. Other advantages will be apparent to those of ordinary skill in the art.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

Figure 1:
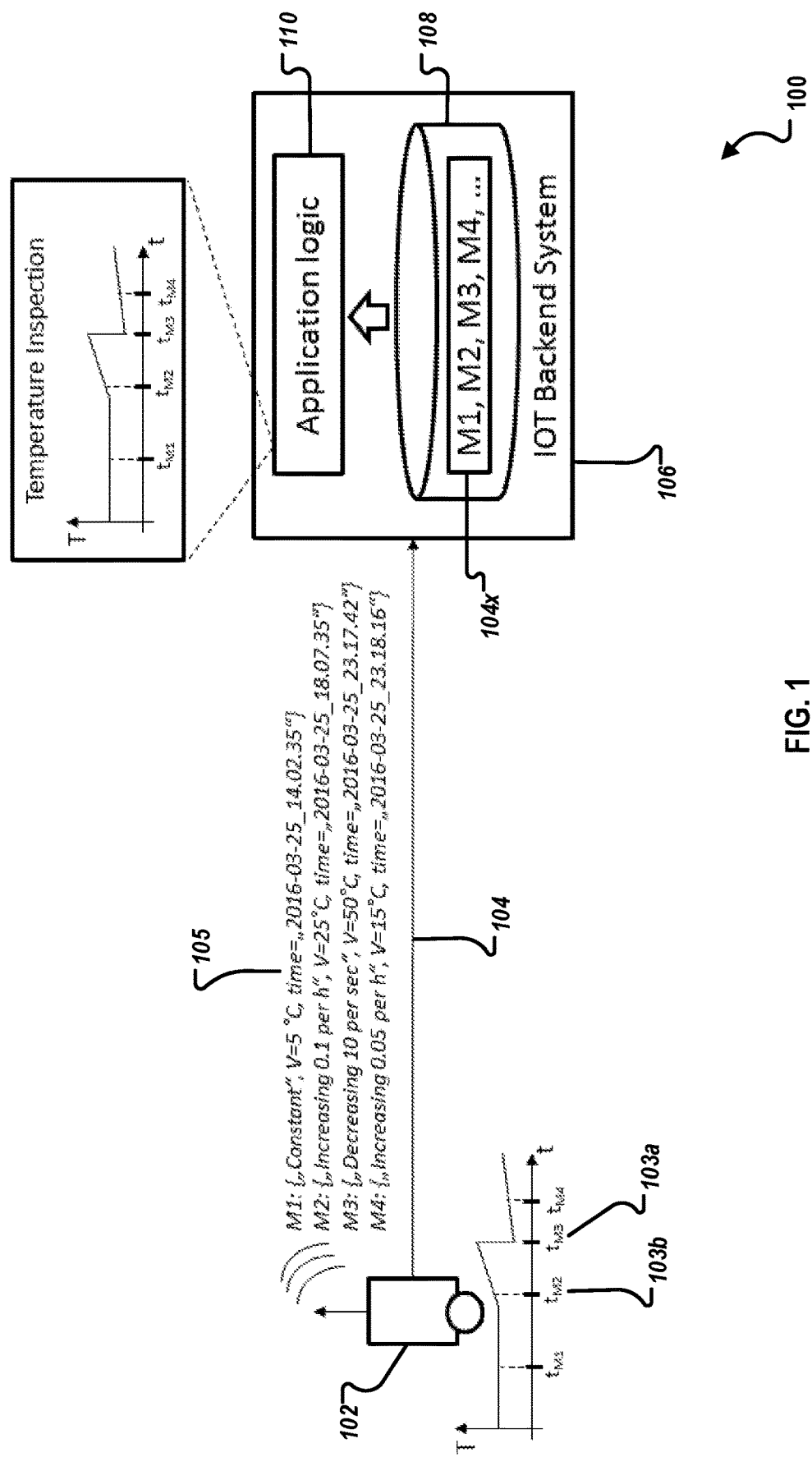
FIG. 1 is a block diagram illustrating an example high-level system view and associated process flow for improving efficiency and performance in Internet-of-Things (IoT) scenarios, according to an implementation.

The following detailed description describes improving efficiency and performance in Internet-of-Things (IoT) scenarios, and is presented to enable any person skilled in the art to make and use the disclosed subject matter in the context of one or more particular implementations. Various modifications to the disclosed implementations will be readily apparent to those skilled in the art, and the general principles defined herein may be applied to other implementations and applications without departing from scope of the disclosure. Thus, the present disclosure is not intended to be limited to the described or illustrated implementations, but is to be accorded the widest scope consistent with the principles and features disclosed herein.

IoT end devices (for example, mobile phones and sensor nodes) collect information about their environment (for example, temperature, air pressure, humidity, etc.) or about themselves (for example, position, velocity, vibration frequency, etc.) by using various sensor and measurement technologies. Current IoT solutions often collect a large number of sensor/measurement datasets, sometimes as many as reasonably possible to have highly-granular data to work with if necessary. These datasets are generated and sent by the end devices over the Internet to a solution provider's central monitoring system. The resulting amount of gathered data is stored and processed according to the needs of a given application as defined by one or more use cases. For example, an IoT application to aid predictive maintenance activities for a machine can use time-series sensor data (such as temperature and vibration) to help schedule repair or maintenance tasks for the machine.

High-frequency (or "chatty") communications and related data storage has resulted in an explosion of operational costs and setup problems. For example, collecting and sending sensor data with a desired density, frequency of observation (for example, every two minutes), and accuracy also leads to high energy consumption at the end devices' side. For example, communications using radio waves is very energy expensive (a rapidly decreasing mobile phone battery charge while intensively using networking protocols such as Bluetooth, LTE, WLAN, etc. are a good example). Typically, communicating with radio waves can be ten times more costly in terms of energy than CPU processing. Communications energy expenditure can contribute to unacceptably high operational costs, since end devices' batteries have to be recharged/replaced frequently.

In standard IoT scenarios, a particular service provider also typically needs powerful, expensive network, processing, and storage capabilities to handle transmission and receipt of incoming messages (often large quantities of messages at high speeds), processing of messages, and data storage. This is particularly true given that each particular IoT application can receive data from multiple end devices.

One common approach to mitigate the above-mentioned problems is to decrease a number of messages that are sent over a network using a definition of threshold values. In such systems, an end device reports a sensor data value, for example a particular temperature, if the end device indicates reaching a certain predefined threshold value of interest for an application in question (for example, 200° C. to raise a fire alarm). A main drawback of this type of resource saving is that it is typically not possible to figure out what values the system actually measured before (or after) the observed parameter actually reached the threshold. When the IOT-solution provider only possesses data based on particular threshold values (that is, only values greater than 200° C.), only the collected data can be applied for other analytical applications. In this case, if an application needed data above 50 but below 200° C., there would be no data to work with.

Another way to reduce required data storage at a backend server or to reduce energy demand at an end device is to use compression techniques on data. Before sending a given message, the end device can compress (that is, encode in some way) the data. The receiving side can then decompress and process the data and can store the compressed data in a data store (for example, a database (for example, relational or non-relational, conventions, in-memory, etc.), a document store, a file share, etc.) to save storage resources. Drawbacks of this approach include increased energy consumption as compressing data requires energy (for example, energy consumed by CPU operation) and that compression may only be applied on application-specific data, leaving per-message overhead unchanged (as it is predefined by a data-carrying network protocol).

The disclosure describes an alternative approach/protocol to capture IoT data in a more efficient and higher-performance manner. While continuously (that is, with a required frequency) measuring values of relevant parameters of interest, such as temperature, air pressure, humidity, etc., an end device can determine a behavior (for example, as a slope) of each parameter in question. For the purposes of this disclosure, a particular behavior may be described as a mathematical or statistical function, depending on the nature of the observed real world process. For example, a temperature curve may have a linear increase or decrease with a certain (static) positive or negative pitch/change rate over time.

The described alternative approach attempts to decouple the proposed protocol from particular mathematical methods. The key principle is not the sending/storage of the data itself, but characteristics of the data. For example, considering a linearly-changing environment parameter or variable, such as in a case of temperature changing in a room over time, if a temperature-sensitive end device periodically measures the temperature in the room (such as every 10 ms) with a particular deviation/accuracy (such as +/−2%) to generate a time series data set, the temperature-sensitive end device can periodically determine a temperature curve's trend/slope behavior (characteristics) (for example, by applying a mathematical linear regression or other method). If the computation period is configured properly, it is possible to perfectly reconstruct effectively every kind of (polynomial) curve as a row/sequence of "elementary" linear curves each covering one period of time. Similarly, in the case where multiple (dependent or independent) variables must be considered, multi-variable regression methods may also be applied (which span two-dimensional (2D), three-dimensional (3D), or even an n-dimensional (nD) shapes, volumes, etc.). The characteristics data can then be used to reconstruct the actual data values.

In the alternative approach, the end device sends a message to a target backend using a network in the case where the behavior of the observed parameter changes, instead of sending all the measured values (either compressed or uncompressed) or not sending anything until a certain threshold value is reached. As a result, power consumption/requirements for each end device is typically reduced. Considering that many end devices can be used per IoT application, and the overall number (constantly increasing) of end devices in use, the cumulative power savings can be immense.

In typical implementations, the message that indicates a given change may include, among other things consistent with this disclosure, the new computed behavior expressed as a function, the first measured value(s) at which the change of behavior occurred (inflection point, certain "drop"), and also a time stamp to indicate when that change was registered by the end device.

A backend server can also store the end device's messages in a data store or process them immediately upon receipt. In both cases the receiving side can reconstruct (that is, compute) the actual behavior of the observed parameter by applying the functions on the start values for a period of time (for example, until a next message arrives). In other words, a data receiver can redraw the actual development of the parameter in question, without storing large amounts of mostly redundant or useless data. Of course, if a computation is needed frequently, reconstructed data points can be persisted.

Turning now to FIG. 1, FIG. 1 is a block diagram 100 illustrating an example high-level system view and associated process flow for improving efficiency and performance in Internet-of-Things (IoT) scenarios, according to an implementation. Here, a sensor node 102 (as associated with an above-described end device) is configured to recognize three types of observed temperature behavior and to send appropriate messages 104 to that effect to an IoT backend system 106 for further processing and storage. In the IoT backend system 106, a database 108 (a data store as described above) can be used to store the received messages 104 and to process the messages 104 using application logic 110. Note, while the describe example is focused on temperature values, those or ordinary skill in the art will understand that any other data type consistent with this disclosure can also be considered (for example, humidity, atmospheric pressure, light level, movement, etc.)

The messages 104 (for example, M1, M2, M3, and M4 with label 104x) all refer to a given temperature change and together describe a history of temperature development beginning at a given point in time. Based on a statically-set or dynamically-generated periodic measurement frequency, the end device can measure a set of temperature values, the end device measuring the temperature values can analyze the set of measured temperature values to generate a change function describing a data value change between the prior data value at a particular time (for example, $t_{M3}$ 103a) and a current data value (for example, $t_{M2}$ 103b). The illustrated changes 105 are detected by the end device and generated using software, a CPU, and memory and applying, for this example, a linear regression method as described above.

In some implementations, the changes 105 are represented as encoded strings (for example, "constant," "increasing with linear rate x per time," etc.) associated with a message(s) 104. Note that, in actual practice, functions would typically be represented in a more compact format (for example, to save memory, reduce message overhead, reducing encoding efforts, etc.), for example "0x+25" could be used to encode the non-changing temperature of 25° C. The illustrated format is presented to assist with understanding. Note that in the illustrated example, a single change 105 is sent per message 104. In other implementations, more than one change 105 can be aggregated and sent using a single message 104 (for example, to maximize the efficient usage of message overhead to reduce the number of messages that are required to be sent). Situations where changes can be aggregated into a single message can include were the changes were not deemed to be critical (such as exceeding a particular change threshold, etc.), the received data is itself of low priority or importance, etc.

On the IoT backend system 106, the database 108 stores the messages 104 received from the sensor node 102. The IOT-application (here, application logic 110), which executes on the IoT backend system 106, supports, among other functions consistent with this disclosure, reconstruction of a temperature curve based on, for example, M1, M2, M3, and M4. The application logic 110 can also allow message selection (for example, range queries, time-selections, etc.). In this example and for a captured period of time, the application logic 110 can read an appropriate number of messages 104 from the database 108, decode encoded changes 105 associated with each message 104, and generate/render time series data (for example, set relevant measurement points on a time axis and draw a curve between each of two given points in time on a computer display or a computer printout).

Sensor nodes 102 will typically be required to send only a few messages, especially if the observed values do not frequently or radically change their behavior. For example, temperature may remain unchanged for a while, which is described by a linear "curve" of zero pitch, or decrease only slightly, for example, by −0.2° C. per hour after turning off heating. Extreme events, such as a sudden increase of temperature, will be indicated to the server, since the measured curve rapidly changes its behavior as well, jumping, for example, from 25 to 200° C.

Note that, in the case of unchanging data behavior, in typical implementations, the sensor node/end device can be configured with a reporting time limit (a statically- or dynamically-generated value). The reporting time limit value is configured as a "safety" measure with respect to the status of the sensor node. For example, if no reporting time limit was set and the sensor has failed to report any data behavior data to a backend server for a particular period of time (such as 2 hours), a question would exist as to: 1) whether nothing has actually changed in the behavior of measured data (such as the above-described temperature measurements) or 2) whether the sensor node is out of service (such as battery, mechanical, etc. failure). Establishing a reporting time limit allows the sensor node to report to the backend server that the sensor node is ALIVE and that nothing with the observed data behavior has changed. In some implementations, the backend server can store configuration information associated with the entire IoT system. For example, information such as a list of sensor nodes/end devices with name, location, protocol, sensing capabilities, technical specification, installation date, last message received, reporting time limit, and the like.

In some implementations, a sensor node can proactively send a message to the backend server. For example, the sensor node can report operational health, low battery condition, possible sensor failure, communication issues, overheating conditions, or general status. These messages may be useful for overall system operation, configuration, and maintenance.

In some implementations, the backend server can request a status update from one or more sensor nodes. The status request may include a request for operational health, status of a monitored parameter or any other request consistent with this disclosure. In some cases, an administrator can initiate the status request, the status request can be generated automatically due to some triggering event (for example, a number of sensor nodes have failed to send messages based on their reporting time limit, etc.). The backend server can also monitor various criteria related to individual sensor nodes (for example, if messages are not being received and the reporting time limit has been satisfied, a sensor node reports a low battery condition, etc.), alert administrators to check the status of the individual sensor nodes, trigger resets/reboots of sensor nodes, or other actions consistent with this disclosure.

The described alternative approach combines the advantages of the above-mentioned existing approaches while eliminating some or all of their drawbacks (for example, the alternative approach can, among other things, save energy, reduce network traffic, and reduce server-side network interface load). As measured sensor data is locally analyzed instead of being sent to a server for further processing, energy is saved (as CPU processing is much more energy efficient than radio wave communications). As a particular sensor node 102 sends an encoded function curve of the measured values, the curve can improve predictions and help trigger actions, because the server can detect a trend earlier than just waiting for a value above or below a defined threshold.

In order to find out what function/curve actually a series of sensor data follows, any existing (and future) mathematical methods consistent with this disclosure may be applied (for example, the above-described linear regression method). For example, the most trivial case is when an observed parameter x does not change its value x=z since t0. In this case, the function result is a simple horizontal line. A sensor node 102 could communicate this result at time t1 (say t1=t0+5 seconds) to the IoT backend system 106. As mentioned above, the data is then encoded in a known format as a mathematical formula (for example, y=0x+z as bit/byte-sequence). Note that in some implementations with security requirements, each message can additionally be encrypted with some desired encryption method (for example, by the sensor node 102 or a coupled network component(s) to preserve end-to-end data security in the described approach).

At the IoT backend system 106, data corresponding to the observed function can be stored in the database 108 or stored based on some schedule for scalability. For example, for a the parameter x {time=t0, value=z}, {time=t0+100 ms, value=z}, {time=t0+200 ms, value=z}, . . . can be stored in the database 108. The IoT backend system 106 can create such values at least until the sensor node 102, reports another curve that indicates a change of parameter x's behavior at tk, say to a quadratic increase.

In some implementations, the IoT backend system 106 can store the encoded information and generate, on demand, a required amount and density of time series values in the database 108 for a particular application. For example, one application may require hourly data points while another may require a higher or lower data density.

Figure 2:
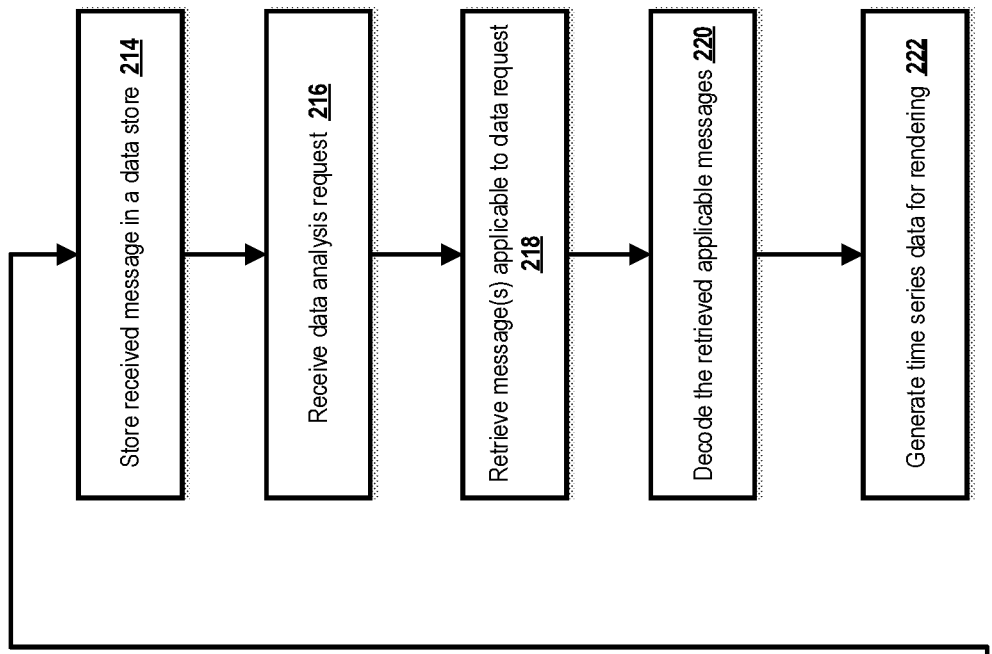
FIG. 2 is a flowchart illustrating an example method for improving efficiency and performance in IoT scenarios, according to an implementation.
Figure 2:
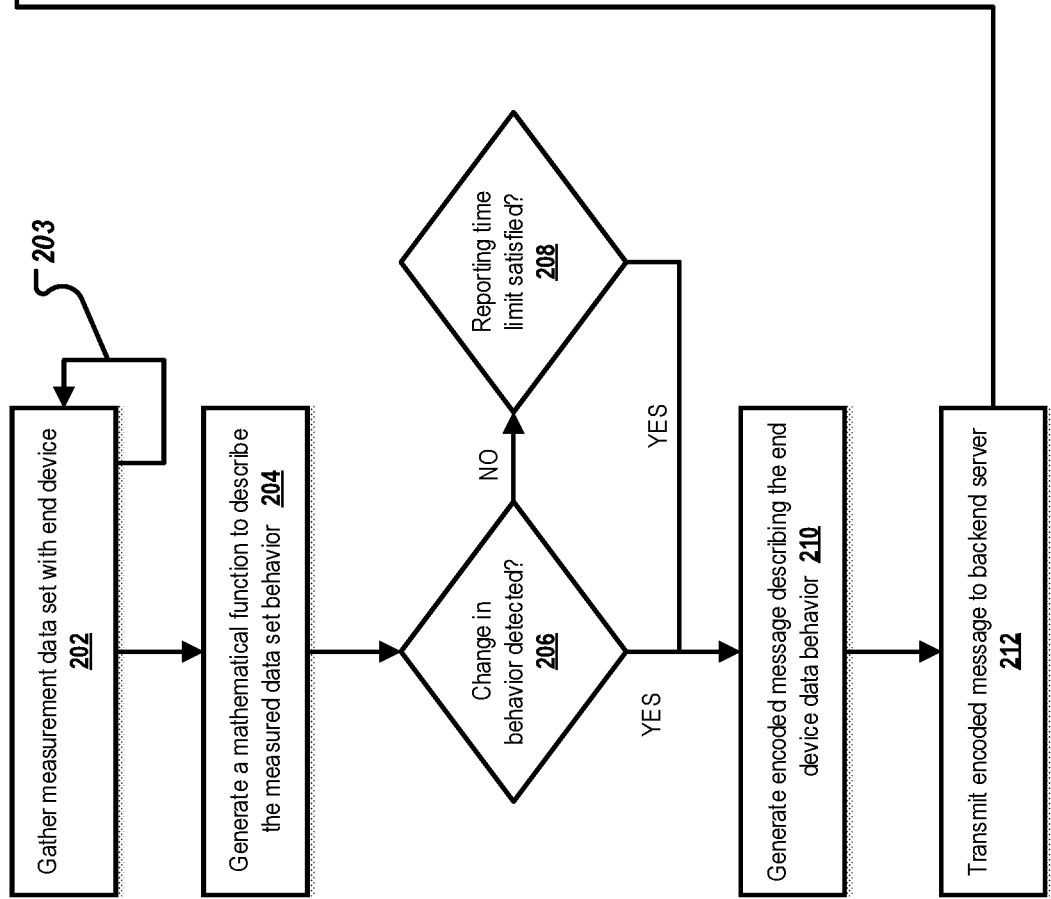

FIG. 2 is a flowchart illustrating an example method 200 for improving efficiency and performance in IoT scenarios, according to an implementation. For clarity of presentation, the description that follows generally describes method 200 in the context of the other figures in this description. However, it will be understood that method 200 may be performed, for example, by any suitable system, environment, software, and hardware, or a combination of systems, environments, software, and hardware as appropriate. In some implementations, various steps of method 200 can be run in parallel, in combination, in loops, or in any order.

At 202, an end device gathers a set of data value measurements. For example a temperature-sensitive end device can analyze temperature values at particular data points of a periodic measurement frequency (indicated by 203). In some implementations, the measurement frequency, number of measurements performed/time to measure, a delay, or when to start a data set measure can be statically- or dynamically-determined. For example, temperature can be measured with an end device with a consistent required frequency of every 10 ms for 1 s (at which a slope value is calculated—see 204 below). In this case, 100 temperature values will be measured for use in the slope value calculation. In other cases, the end device can be configured to delay for a particular amount of time before starting measurements according to a particular frequency. In other cases, more than one set of measurements can be gathered before the end device proceeds to determine data behavior/characteristics of measured data. As will be appreciated by those of ordinary skill in the art, the end device is configurable according to any combination(s) of measurement frequency, measurement time frames, start/end measurement times, delays, or other factors consistent with this disclosure. From 202, method 200 proceeds to 204.

At 204, the end device generates a mathematical function to describe the behavior (characteristics) of the measured set of data values. From 204, method 200 proceeds to 206.

At 206, using the mathematical function, a determination is made as to whether a change in behavior has occurred between the currently-measured set of data values and the prior-measured set of data values. If a change in behavior has been detected, method 200, proceeds to 210. If a change in behavior has not been detected, method 200 proceeds to 208.

At 208, a determination is made as to whether a reporting time limit has been satisfied (for example, equaled/exceeded or simply exceeded). If it is determined that the reporting time limit has been satisfied, method 200 proceeds to 210. If it is determined that the reporting time limit has not been satisfied, no data as to the fact a change in data behavior was not detected is reported to a backend server.

At 210, an encoded message is generated representing the behavior of the gathered set of measurement data. The encoding is based on the generated mathematical function describing the behavior of the gathered set of measurement data. From 210, method 200 proceeds to 212.

At 212, the generated encoded message is transmitted to the backend server. From 212, method 200 proceeds to 214.

At 214, the received encoded message is stored in a data store associated with the backend server. From 214, method 200 proceeds to 216.

At 216, the backend server receives a data analysis request associated with the stored data behavior data of the end device. From 216, method 200 proceeds to 218.

At 218, the backend server retrieves messages from the data store associated with the end device and applicable to the data request (for example, a particular date/time range for analysis). From 218, method 200 proceeds to 220.

At 220, the backend server decodes the retrieved applicable messages. From 220, method 200 proceeds to 222.

At 222, the using the decoded data behavior data, the backend server generates time series data for rendering to the data requestor. After 220, method 200 stops.

Figure 3:
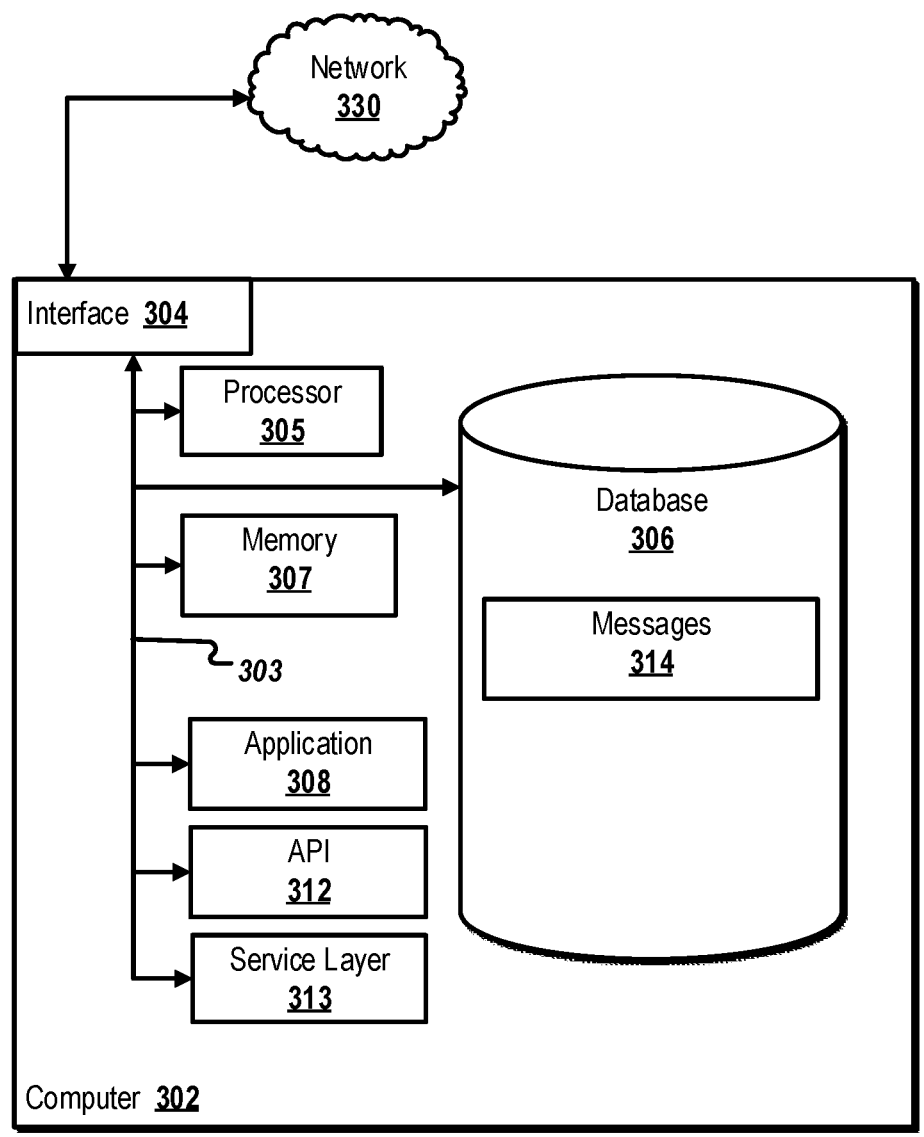
FIG. 3 is a block diagram illustrating an exemplary computer system used to provide computational functionalities associated with described algorithms, methods, functions, processes, flows, and procedures as described in the instant disclosure, according to an implementation.

FIG. 3 is a block diagram illustrating an exemplary computer system 300 used to provide computational functionalities associated with described algorithms, methods, functions, processes, flows, and procedures as described in the instant disclosure, according to an implementation. The illustrated computer 302 is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device.

Additionally, the computer 302 may comprise an input device, such as a keypad, keyboard, touch screen, or other device that can accept user information, and an output device that conveys information associated with the operation of the computer 302, including digital data, visual, or audio information (or a combination of information), or a GUI.

The computer 302 can serve in a role as a client, network component, a server, a database or other persistency, or any other component (or a combination of roles) of a computer system for performing the subject matter described in the instant disclosure. The illustrated computer 302 is communicably coupled with a network 330. In some implementations, one or more components of the computer 302 may be configured to operate within environments, including cloud-computing-based, local, global, or other environment (or a combination of environments).

At a high level, the computer 302 is an electronic computing device operable to receive, transmit, process, store, or manage data and information associated with the described subject matter. According to some implementations, the computer 302 may also include or be communicably coupled with an application server, e-mail server, web server, caching server, streaming data server, business intelligence (BI) server, or other server (or a combination of servers).

The computer 302 can receive requests over network 330 from a client application (for example, executing on another computer 302) and responding to the received requests by processing the said requests in an appropriate software application. In addition, requests may also be sent to the computer 302 from internal users (for example, from a command console or by other appropriate access method), external or third-parties, other automated applications, as well as any other appropriate entities, individuals, systems, or computers.

Each of the components of the computer 302 can communicate using a system bus 303 (for example, implemented as part of a main processing board, etc.). In some implementations, any or all of the components of the computer 302, both hardware or software (or a combination of hardware and software), may interface with each other or the interface 304 (or a combination of both) over the system bus 303 using an application programming interface (API) 312 or a service layer 313 (or a combination of the API 312 and service layer 313). The API 312 may include specifications for routines, data structures, and object classes. The API 312 may be either computer-language independent or dependent and refer to a complete interface, a single function, or even a set of APIs. The service layer 313 provides software services to the computer 302 or other components (whether or not illustrated) that are communicably coupled to the computer 302. The functionality of the computer 302 may be accessible for all service consumers using this service layer. Software services, such as those provided by the service layer 313, provide reusable, defined business functionalities through a defined interface. For example, the interface may be software written in JAVA, C++, or other suitable language providing data in extensible markup language (XML) format or other suitable format. While illustrated as an integrated component of the computer 302, alternative implementations may illustrate the API 312 or the service layer 313 as stand-alone components in relation to other components of the computer 302 or other components (whether or not illustrated) that are communicably coupled to the computer 302. Moreover, any or all parts of the API 312 or the service layer 313 may be implemented as child or sub-modules of another software module, enterprise application, or hardware module without departing from the scope of this disclosure.

The computer 302 includes an interface 304. Although illustrated as a single interface 304 in FIG. 3, two or more interfaces 304 may be used according to particular needs, desires, or particular implementations of the computer 302. The interface 304 is used by the computer 302 for communicating with other systems/components in a distributed environment that are connected to the network 330 (whether illustrated or not). For example, network 330 can be connected to one or more sensor nodes 102 from FIG. 1. Generally, the interface 304 comprises logic encoded in software or hardware (or a combination of software and hardware) and operable to communicate with the network 330. More specifically, the interface 304 may comprise software supporting one or more communication protocols associated with communications such that the network 330 or interface's hardware is operable to communicate physical signals within and outside of the illustrated computer 302.

The computer 302 includes a processor 305. Although illustrated as a single processor 305 in FIG. 3, two or more processors may be used according to particular needs, desires, or particular implementations of the computer 302. Generally, the processor 305 executes instructions and manipulates data to perform the operations of the computer 302 and any algorithms, methods, functions, processes, flows, and procedures as described in the instant disclosure.

The computer 302 also includes a database 306 that can hold data for the computer 302 or other components (or a combination of both) that can be connected to the network 330 (whether illustrated or not). For example, database 306 can be an in-memory, conventional, or other type of database storing data consistent with this disclosure. In some implementations, database 306 can be a combination of two or more different database types (for example, a hybrid in-memory and conventional database) according to particular needs, desires, or particular implementations of the computer 302 and the described functionality. Although illustrated as a single database 306 in FIG. 3, two or more databases (of the same or combination of types) can be used according to particular needs, desires, or particular implementations of the computer 302 and the described functionality. While database 306 is illustrated as an integral component of the computer 302, in alternative implementations, database 306 can be external to the computer 302. As illustrated, the database 306 stored messages 314 (for example, messages 104 in FIG. 1).

The computer 302 also includes a memory 307 that can hold data for the computer 302 or other components (or a combination of both) that can be connected to the network 330 (whether illustrated or not). For example, memory 307 can be random access memory (RAM), read-only memory (ROM), optical, magnetic, and the like storing data consistent with this disclosure. In some implementations, memory 307 can be a combination of two or more different types of memory (for example, a combination of RAM and magnetic storage) according to particular needs, desires, or particular implementations of the computer 302 and the described functionality. Although illustrated as a single memory 307 in FIG. 3, two or more memories 307 (of the same or combination of types) can be used according to particular needs, desires, or particular implementations of the computer 302 and the described functionality. While memory 307 is illustrated as an integral component of the computer 302, in alternative implementations, memory 307 can be external to the computer 302.

The application 308 (for example, application logic 110 in FIG. 1) is typically an algorithmic software engine providing functionality according to particular needs, desires, or particular implementations of the computer 302, particularly with respect to functionality described in this disclosure. For example, application 308 can serve as one or more components, modules, applications, etc. Further, although illustrated as a single application 308, the application 308 may be implemented as multiple applications 307 on the computer 302. In addition, although illustrated as integral to the computer 302, in alternative implementations, the application 308 can be external to the computer 302.

There may be any number of computers 302 associated with, or external to, a computer system containing computer 302, each computer 302 communicating over network 330. Further, the term "client," "user," and other appropriate terminology may be used interchangeably as appropriate without departing from the scope of this disclosure. Moreover, this disclosure contemplates that many users may use one computer 302, or that one user may use multiple computers 302.

As will be appreciated by those of ordinary skill in the art, the computer 300 can also represent an above-described end device/sensor node. In the case of an end device, the illustrated computer 300 can be represented in a different configuration with additional, fewer, or different components as currently illustrated. For example, an end device configuration can also include various sensors (for example, temperature, humidity, atmospheric pressure, etc.), a battery, etc.

While the disclosure is focused on IoT scenarios, it should be clear to those of ordinary skill in the art that the above-describe methodology has applications outside of IoT scenarios.

Described implementations of the subject matter can include one or more features, alone or in combination.

For example, in a first implementation, a computer-implemented method, comprising: gathering a set of measurement data over a period of time using a network-enabled end device; generating a mathematical function to describe behavior of the set of measurement data; generating a compact, encoded message representing the behavior of the gathered set of measurement data; transmitting the compact, encoded message for storage in a data store associated with a backend server; responsive to a received data analysis request, decoding particular compact, encoded messages stored in the data store and applicable to the data analysis request; and generating time series data reconstructing the measurement data based on the decoded messages.

The foregoing and other described implementations can each optionally include one or more of the following features:

A first feature, combinable with any of the following features, wherein the measurement data is gathered according to a defined measurement frequency.

A second feature, combinable with any of the previous or following features, wherein the mathematical function is a single- or multi-variable linear regression method.

A third feature, combinable with any of the previous or following features, comprising determining whether a change in behavior has been detected between the described behavior of the set of measurement data and prior described behavior of a prior set of measurement data.

A fourth feature, combinable with any of the previous or following features, comprising determining, when a change in behavior has not been detected, whether a reporting time limit has been satisfied prior to sending a compact, encoded message to the backend server indicating at least no change in data behavior has occurred.

A fifth feature, combinable with any of the previous or following features, wherein the compact, encoded message includes the described behavior expressed as mathematical function, the first measured value at which the change in behavior occurred, and a time stamp indicating when the change in behavior was detected by the end device.

A sixth feature, combinable with any of the previous or following features, wherein the compact, encoded message is encrypted prior to transmission to the backend server.

In a second implementation, a non-transitory, computer-readable medium storing one or more instructions executable by a computer system to perform operations comprising: gathering a set of measurement data over a period of time using a network-enabled end device; generating a mathematical function to describe behavior of the set of measurement data; generating a compact, encoded message representing the behavior of the gathered set of measurement data; transmitting the compact, encoded message for storage in a data store associated with a backend server; responsive to a received data analysis request, decoding particular compact, encoded messages stored in the data store and applicable to the data analysis request; and generating time series data reconstructing the measurement data based on the decoded messages.

The foregoing and other described implementations can each optionally include one or more of the following features:

A first feature, combinable with any of the following features, wherein the measurement data is gathered according to a defined measurement frequency.

A second feature, combinable with any of the previous or following features, wherein the mathematical function is a single- or multi-variable linear regression method.

A third feature, combinable with any of the previous or following features, comprising one or more instructions to determine whether a change in behavior has been detected between the described behavior of the set of measurement data and prior described behavior of a prior set of measurement data.

A fourth feature, combinable with any of the previous or following features, comprising one or instructions to determine, when a change in behavior has not been detected, whether a reporting time limit has been satisfied prior to sending a compact, encoded message to the backend server indicating at least no change in data behavior has occurred.

A fifth feature, combinable with any of the previous or following features, wherein the compact, encoded message includes the described behavior expressed as mathematical function, the first measured value at which the change in behavior occurred, and a time stamp indicating when the change in behavior was detected by the end device.

A sixth feature, combinable with any of the previous or following features, wherein the compact, encoded message is encrypted prior to transmission to the backend server.

In a third implementation, a computer-implemented system, comprising: a computer memory; and a hardware processor interoperably coupled with the computer memory and configured to perform operations comprising: gathering a set of measurement data over a period of time using a network-enabled end device; generating a mathematical function to describe behavior of the set of measurement data; generating a compact, encoded message representing the behavior of the gathered set of measurement data; transmitting the compact, encoded message for storage in a data store associated with a backend server; responsive to a received data analysis request, decoding particular compact, encoded messages stored in the data store and applicable to the data analysis request; and generating time series data reconstructing the measurement data based on the decoded messages.

The foregoing and other described implementations can each optionally include one or more of the following features:

A first feature, combinable with any of the following features, wherein the measurement data is gathered according to a defined measurement frequency.

A second feature, combinable with any of the previous or following features, wherein the mathematical function is a single- or multi-variable linear regression method.

A third feature, combinable with any of the previous or following features, further configured to determine whether a change in behavior has been detected between the described behavior of the set of measurement data and prior described behavior of a prior set of measurement data.

A fourth feature, combinable with any of the previous or following features, further configured to determine, when a change in behavior has not been detected, whether a reporting time limit has been satisfied prior to sending a compact, encoded message to the backend server indicating at least no change in data behavior has occurred.

A fifth feature, combinable with any of the previous or following features, wherein the compact, encoded message includes the described behavior expressed as mathematical function, the first measured value at which the change in behavior occurred, and a time stamp indicating when the change in behavior was detected by the end device.

A sixth feature, combinable with any of the previous or following features, wherein the compact, encoded message is encrypted prior to transmission to the backend server.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, that is, one or more modules of computer program instructions encoded on a tangible, non-transitory, computer-readable computer-storage medium for execution by, or to control the operation of, data processing apparatus. Alternatively or in addition, the program instructions can be encoded on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data may be less than 1 ms, less than 1 sec., less than 5 secs., etc. While the requested data need not be displayed (or initiated for display) instantaneously, it is displayed (or initiated for display) without any intentional delay, taking into account processing limitations of a described computing system and time required to, for example, gather, accurately measure, analyze, process, store, and/or transmit the data.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be or further include special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, IOS, or any other suitable conventional operating system.

A computer program, which may also be referred to or described as a program, software, a software application, a module, a software module, a script, or code can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, for example, a CPU, an FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM), or both. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, for example, erasable programmable read-only memory (EPROM), electrically erasable programmable read-only memory (EEPROM), and flash memory devices; magnetic disks, for example, internal hard disks or removable disks; magneto-optical disks; and CD-ROM, DVD+/−R, DVD-RAM, and DVD-ROM disks. The memory may store various objects or data, including caches, classes, frameworks, applications, backup data, jobs, web pages, web page templates, database tables, repositories storing dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with this disclosure), all or a portion of the Internet, or any other communication system or systems at one or more locations (or a combination of communication networks). The network may communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, both hardware or software (or a combination of hardware and software), may interface with each other or the interface using an application programming interface (API) or a service layer (or a combination of API and service layer). The API may include specifications for routines, data structures, and object classes. The API may be either computer language independent or dependent and refer to a complete interface, a single function, or even a set of APIs. The service layer provides software services to the computing system. The functionality of the various components of the computing system may be accessible for all service consumers using this service layer. Software services provide reusable, defined business functionalities through a defined interface. For example, the interface may be software written in JAVA, C++, or other suitable language providing data in extensible markup language (XML) format or other suitable format. The API or service layer (or a combination of the API and the service layer) may be an integral or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although features may be described above as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the implementations described above should not be understood as requiring such separation or integration in all implementations, and it should be understood that the described program components and systems can generally be integrated together in a single software product or packaged into multiple software products.

Accordingly, the above description of example implementations does not define or constrain this disclosure. Other changes, substitutions, and alterations are also possible without departing from the spirit and scope of this disclosure.

Furthermore, any claimed implementation below is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:
   gathering a set of measurement data over a period of time using a network-enabled end device, wherein the network-enabled end device comprises an Internet-of-Things (loT) end device;
   generating a mathematical function to describe a behavior of the set of measurement data;
   determining whether a change in the behavior of the set of measurement data is detected;
   in response to determining that the behavior remained unchanged, determining that a reporting time limit is satisfied;
   in response to determining that the reporting time limit is satisfied or in response to determining that the change in the behavior of the set of measurement data is detected, generating, by the network-enabled end device, a compact, encoded message as a replacement of the set of measurement data, wherein the compact, encoded message is encoded based on the generated mathematical function, and the set of measurement data are reconstructable from the compact, encoded message;
   transmitting, by the network-enabled end device and to a backend server, the compact, encoded message for storage in a data store associated with the backend server;
   receiving, by the backend server, a data analysis request;
   in response to receiving the data analysis request, retrieving, by the backend server and from the data store, a portion of compact, encoded messages applicable to the data analysis request;
   decoding, by the backend server, the portion of the compact, encoded messages to generate decoded messages; and
   generating, by the backend server, time series data reconstructing the set of measurement data based on the decoded messages.

2. The computer-implemented method of claim 1, wherein the set of measurement data is gathered according to a defined measurement frequency.

3. The computer-implemented method of claim 1, wherein the mathematical function is a single- or multi-variable linear regression method.

4. The computer-implemented method of claim 1, comprising determining whether a change in behavior has been detected between the behavior of the set of measurement data and prior behavior of prior measurement data.

5. The computer-implemented method of claim 1, wherein the compact, encoded message comprises the behavior expressed as the mathematical function, a first measured value at which a change in behavior occurred, and a time stamp indicating when the change in behavior was detected by the network-enabled end device.

6. The computer-implemented method of claim 1, wherein the compact, encoded message is encrypted prior to transmission to the backend server.

7. A non-transitory, computer-readable medium storing one or more instructions executable by a computer system to perform operations comprising:
   gathering a set of measurement data over a period of time using a network-enabled end device, wherein the network-enabled end device comprises an Internet-of-Things (loT) end device;
   generating a mathematical function to describe a behavior of the set of measurement data;
   determining whether a change in the behavior of the set of measurement data is detected;
   in response to determining that the behavior remained unchanged, determining that a reporting time limit is satisfied;
   in response to determining that the reporting time limit is satisfied or in response to determining that the change in the behavior of the set of measurement data is detected, generating, by the network-enabled end device, a compact, encoded message as a replacement of the set of measurement data, wherein the compact, encoded message is encoded based on the generated mathematical function, and the set of measurement data are reconstructable from the compact, encoded message;
   transmitting, by the network-enabled end device and to a backend server, the compact, encoded message for storage in a data store associated with the backend server;
   receiving, by the backend server, a data analysis request;
   in response to receiving the data analysis request, retrieving, by the backend server and from the data store, a portion of compact, encoded messages applicable to the data analysis request;
   decoding, by the backend server, the portion of the compact, encoded messages to generate decoded messages; and
   generating, by the backend server, time series data reconstructing the set of measurement data based on the decoded messages.

8. The non-transitory, computer-readable medium of claim 7, wherein the set of measurement data is gathered according to a defined measurement frequency.

9. The non-transitory, computer-readable medium of claim 7, wherein the mathematical function is a single- or multi-variable linear regression method.

10. The non-transitory, computer-readable medium of claim 7, comprising one or more instructions to determine whether a change in behavior has been detected between the behavior of the set of set of measurement data and prior behavior of prior measurement data.

11. The non-transitory, computer-readable medium of claim 7, wherein the compact, encoded message comprises the behavior expressed as the mathematical function, a first measured value at which a change in behavior occurred, and a time stamp indicating when the change in behavior was detected by the network-enabled end device.

12. The non-transitory, computer-readable medium of claim 7, wherein the compact, encoded message is encrypted prior to transmission to the backend server.

13. A computer-implemented system, comprising:
a computer memory; and
a hardware processor interoperably coupled with the computer memory and configured to perform operations comprising:
gathering a set of measurement data over a period of time using a network-enabled end device, wherein the network-enabled end device comprises an Internet-of-Things (IoT) end device,
generating a mathematical function to describe a behavior of the set of measurement data,
determining whether a change in the behavior of the set of measurement data is detected,
in response to determining that the behavior remained unchanged, determining that a reporting time limit is satisfied,
in response to determining that the reporting time limit is satisfied or in response to determining that the change in the behavior of the set of measurement data is detected, generating, by the network-enabled end device, a compact, encoded message as a replacement of the set of measurement data, wherein the compact, encoded message is encoded based on the generated mathematical function, and the set of measurement data are reconstructable from the compact, encoded message,
transmitting, by the network-enabled end device and to a backend server, the compact, encoded message for storage in a data store associated with the backend server;
receiving, by the backend server, a data analysis request,
in response to receiving the data analysis request, retrieving, by the backend server and from the data store, a portion of compact, encoded messages applicable to the data analysis request,
decoding, by the backend server, the portion of the compact, encoded messages to generate decoded messages, and
generating, by the backend server, time series data reconstructing the set of measurement data based on the decoded messages.

14. The computer-implemented system of claim 13, wherein the set of measurement data is gathered according to a defined measurement frequency.

15. The computer-implemented system of claim 13, wherein the mathematical function is a single- or multi-variable linear regression method.

16. The computer-implemented system of claim 13, further configured to determine whether a change in behavior has been detected between the behavior of the set of measurement data and prior behavior of prior measurement data.

17. The computer-implemented system of claim 13, wherein the compact, encoded message:
comprises the behavior expressed as the mathematical function, a first measured value at which a change in behavior occurred, and a time stamp indicating when the change in behavior was detected by the network-enabled end device; and
is encrypted prior to transmission to the backend server.

* * * * *